United States Patent [19]

Hockley

[11] Patent Number: 4,799,864
[45] Date of Patent: Jan. 24, 1989

[54] HYDRO-PNEUMATIC PUMPSETS

[75] Inventor: Stephen J. Hockley, Portsmouth, England

[73] Assignee: Action Pumping Services Ltd., England

[21] Appl. No.: 108,798

[22] Filed: Oct. 15, 1987

[30] Foreign Application Priority Data

Oct. 17, 1986 [GB] United Kingdom ............... 8624953

[51] Int. Cl.$^4$ .................. F04B 41/06; F04B 49/00
[52] U.S. Cl. .................................. 417/7; 417/19;
417/36; 417/63; 137/207.5; 137/208; 137/567
[58] Field of Search ........................... 417/2-7,
417/19, 36, 426, 38, 63; 137/114, 207, 207.5,
208, 567

[56] References Cited

U.S. PATENT DOCUMENTS

| 2,246,940 | 6/1941 | Hood ..................................... 417/7 |
| 3,229,639 | 1/1966 | Hignutt et al. ..................... 417/7 X |
| 3,746,471 | 7/1973 | Gray et al. ........................... 417/7 |
| 4,281,968 | 8/1981 | Akers ..................................... 417/2 |

FOREIGN PATENT DOCUMENTS

| 836299 | 3/1970 | Canada ................................. 417/7 |
| 794261 | 1/1981 | U.S.S.R. ............................ 137/207 |

Primary Examiner—Carlton R. Croyle
Assistant Examiner—Paul F. Neils
Attorney, Agent, or Firm—Cushman, Darby & Cushman

[57] ABSTRACT

A packaged hydro-pneumatic pumpset system in which a plurality of pumps J1, M2, M3 are brought into operation sequentially as water pressure in the system drops below pre-set values. The system includes an accumulator 6 for storing water to maintain pressure in the system when the pumps are not operating and a prime is maintained on the pumps by means of a footvalve in the suction pipe inlet. The system also includes a second accumulator 9, which is connected to the first and which is arranged, when the pumps are inoperative, to maintain a reservoir of stored pressurized water in the suction manifold.

5 Claims, 3 Drawing Sheets

HYDRO-PNEUMATIC PUMPSETS

DESCRIPTION

This invention relates to packaged hydro-pneumatic pumpsets. Such packaged pumpsets are primarily used to supply pressurised water automatically on demand such as for instance on golf courses where sprinkler systems are provided to water the greens when required, and in high rise buildings where pressurised water is required to be provided to individual floors. The pumpsets comprise a number of pumps, normally centrifugal, vertical, multistage pumps, which are arranged to be switched on or off via pressure switches and an hydraulic accumulator or pressure vessel.

The hydraulic accumulator has a steel shell with an internal removable rubber diaphragm separating the gas and water spaces. Compressed air is normally used to maintain the water pressure in the system when there is no demand, and the pumps are not operating.

When water is required downstream, as by the opening of valves or taps, for example, initial demand is met by the water already stored in the discharge pressure vessel. However, if the volume of stored water is insufficient to meet the demand, the water pressure in the system will fall and at a predetermined pressure, a pressure switch is actuated, to start a first pump of the pumpset. This first pump is normally of a lower output than the remainder of the pumps in the pumpset and is referred to as a jockey pump.

If this jockey pump is unable to meet the demand, then the pressure in the system will continue to fall and a second pump, termed a booster pump will be brought into operation by actuation of a second pressure switch. Similarly, if the jockey pump and first booster pump are unable together to meet the demand, then the pressure in the system will continue to fall and a second booster pump is brought into operation by actuation of a third pressure switch.

As the demand is satisfied, then the pressure will rise, the discharge pressure vessel will be recharged and the three pressure switches will again be actuated in reverse order to the starting sequence to cut out the respective pumps. The discharge pressure vessel which has now been recharged will then maintain the pressure in the system until the pumps are required again.

Each pump has a non-return valve fitted to the discharge port in order to prevent pressurised water returning to suction, and to inhibit back spinning (turbining) of a pump when an individual pump is not operating, to prevent damage thereto.

In the event of loss of prime to the suction manifold, and without adequate protection, all the pumps would run dry, with consequent damage thereto, and disabling the pumps until repair or replacement can be effected. When the water supply is below the level of the pumpset inlet manifold, most hydro-pneumatic pumpsets rely only on a footvalve, fitted to the suction pump inlet to maintain their prime. However, footvalves are particularly unreliable requiring only a very small piece of debris, such as grit or twigs, for example, to prevent the footvalve from seating properly. This would result in a loss of prime to the pumpset and the risk of running the pumps dry.

An object of the present invention is to overcome the problem of maintaining a constant prime to the inlet manifold of packaged hydro-pneumatic pumpsets.

This is achieved in the present invention by providing a second hydraulic accumulator or discharge pressure vessel directly connected to the first pressure vessel and into the suction manifold, as will be hereinafter described.

Thus, according to the present invention there is provided a packaged hydro-pneumatic pumpset system, including a plurality of pumps connected to suction and discharge manifolds and arranged to be brought into operation sequentially when required in response to actuation of respective pressure switches, a footvalve in the suction pipe inlet to maintain a prime on the pumps and an hydraulic accumulator arranged to store water such as to maintain pressure in the system when the pumps are not operating, characterised in that a second hydraulic accumulator is included in the system and connected to the first accumulator via a non-return valve and to the suction manifold of the pumps via means arranged to be actuated when all the pumps are inoperative, to maintain a reservoir of stored pressurised water in the suction manifold to assist the footvalve to form a positive seal by remaining closed on its seating.

The invention will now be described by way of example only with particular reference to the accompanying drawings wherein.

Figure 1:
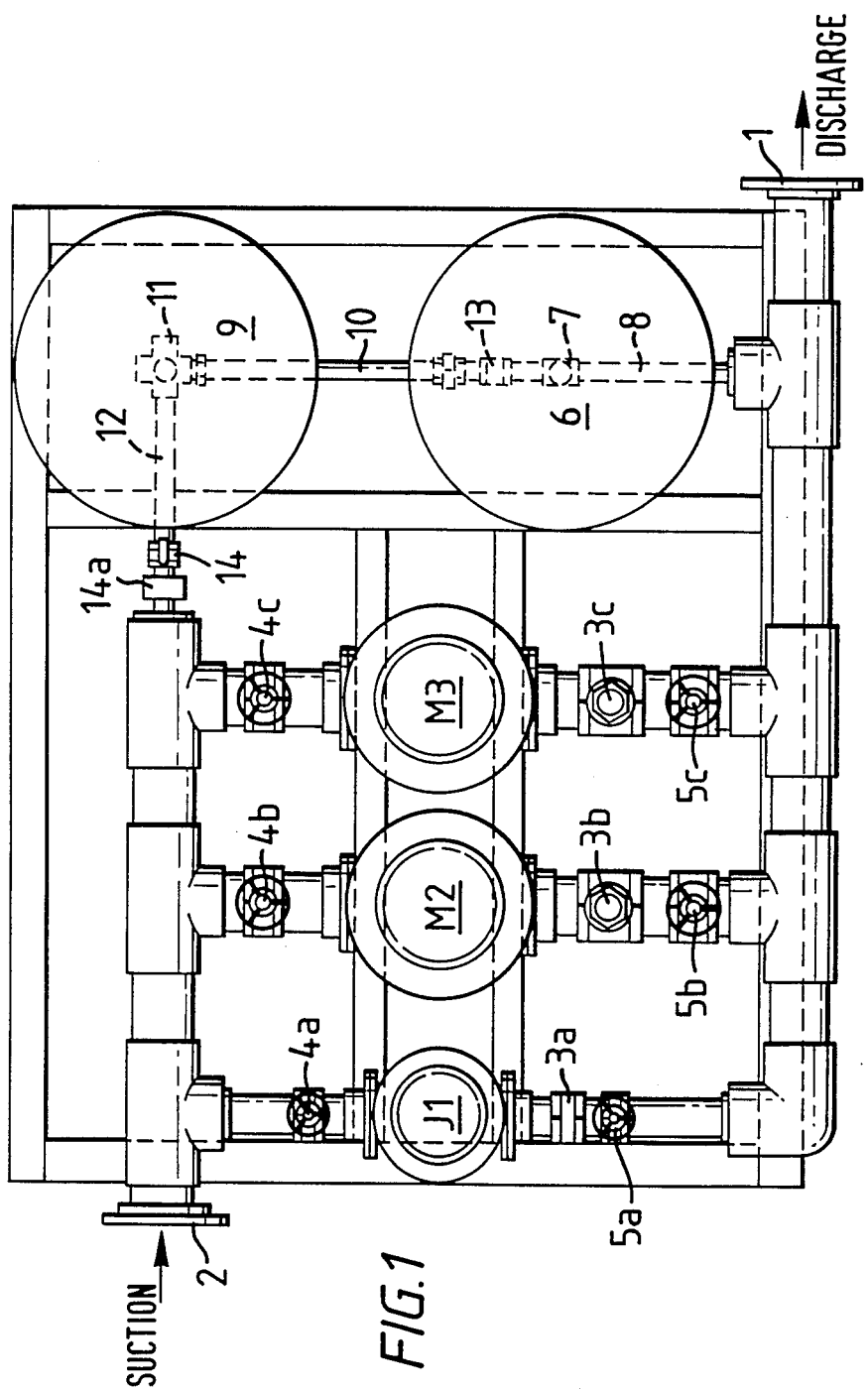
FIG. 1 is a plan view of a packaged hydro-pneumatic pumpset of the present invention.

The pumpset comprises a jockey pump J1 and two booster pumps M2, M3 connected between a discharge manifold 1 and a suction manifold 2. Each pump J1, M2, M3 has a non-return valve 3a, 3b, 3c, respectively located between the respective pump and the discharge manifold 1, in order to prevent pressurised water returning to suction and to prevent turbining as previously explained. Each pump J1, M2, M3 also has an inlet valve 4a, 4b, 4c respectively connected between the respective pump and the suction manifold 2. Similarly, each pump J1, M2, M3 has a discharge valve 5a, 5b, 5c respectively connected between the respective pump and the discharge manifold 1 as previously described.

A discharge pressure vessel 6 is connected to the discharge manifold 1 via a T-junction 7 and pipe 8 and a suction prime pressure vessel 9 is directly connected to the discharge pressure vessel 6 via pipe 10 and a multi T-junction 11 which is also connected by a pipe 12 to the discharge end of the suction manifold 2. A non-return valve 13 is located in the pipe 10 between the two pressure vessels 6, 9, and a solenoid valve 14 is located in the pipe 12 between the suction prime pressure vessel 9 and the suction manifold 2. The non-return valve 13 prevents the stored water in the suction prime pressure vessel 9 being used to satisfy demand in the discharge system and ensures a quantity of water is always stored to maintain a prime to the suction manifold 2.

A liquid level probe 14a is located between the suction manifold tee junction to the pump M3 and the solenoid valve 14 to detect a complete absence of water in the system and to shut off the system should this occur.

The solenoid valve 14 will open only when all the pumps J1, M2, M3 are inoperative, thereby maintaining a reservoir of stored, pressurised water to the suction pipework and assisting the footvalve 25 to seat and form a positive seal and remain firmly closed.

In the event of any of the pumps starting up, the solenoid valve 14 will close thereby eliminating the positive pressure in the suction pipework and allowing the footvalve to open and the pumps to draw a prime.

Should this footvalve not seat properly, then the suction prime vessel 9 would maintain the prime. The stored water in the discharge pressure vessel 6 and the pressurized water in the discharge system would also assist in maintaining the prime if required.

The failure of the footvalve 25 would result in a fall of pressure in the pressure vessels 6, 9, and in the discharge pipework which would be detected by pressure switches 15a, 15b, 15c associated with the respective pumps J1, M2, M3, and which would then initiate the pumps starting sequence before any loss of prime. The pumps would then run whilst still fully primed.

Figure 2:
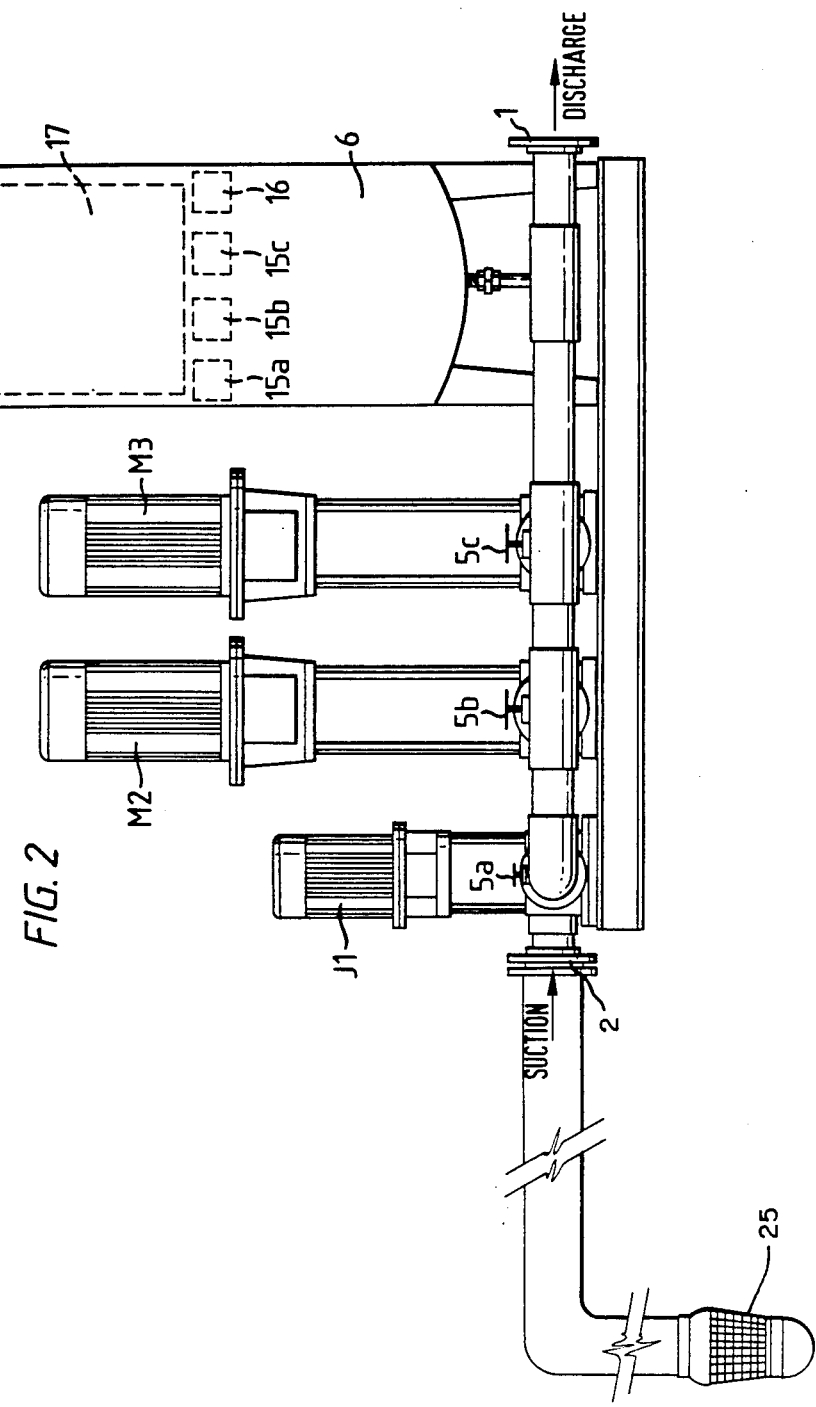
FIG. 2 is a front elevation thereof.
Figure 3:
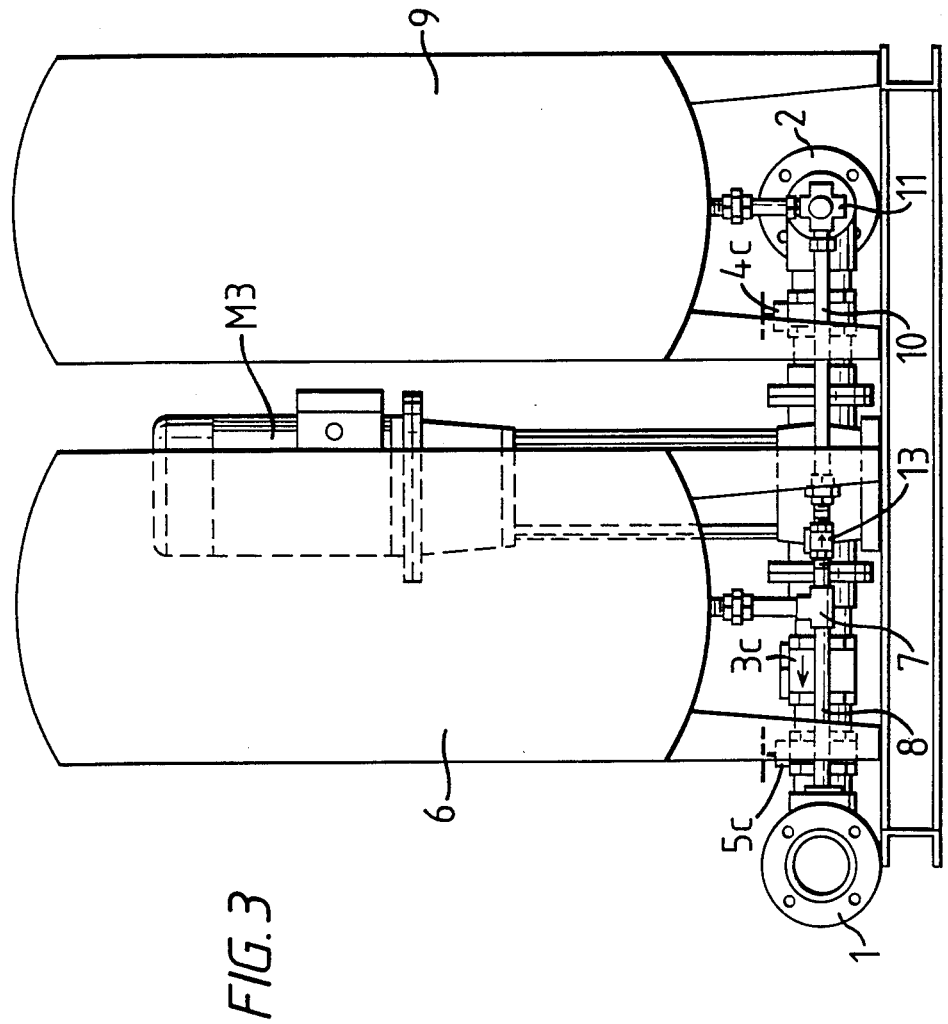
FIG. 3 is a side elevation thereof.

Any leaks due to a faulty footvalve 25 would be detected by a low suction pressure switch 16 which would initiate an audible and/or visual alarm 27. Repetitive footvalve failure would result in the shutdown of the pumpset until the fault has been rectified. However, most obstructions to the footvalve seat are likely to be cleared by the flow of water when the pumps are running. An auto control panel 17 is provided as shown in FIG. 2.

It will be appreciated that the invention is capable of considerable modification and is not to be deemed limited to the particular constructional details illustrated in the drawings and described with reference thereto by way of example only.

I claim:

1. A packaged hydro-pneumatic pumpset system including a plurality of pumps connected to suction and discharge manifolds and arranged to be brought into operation sequentially when required in response to actuation of respective pressure switches, a footvalve in the suction pipe inlet to maintain a prime on the pumps and an hydraulic accumulator arranged to store water such as to maintain pressure in the system when the pumps are not operating, characterised in that a second hydraulic accumulator is included in the system and connected to the first accumulator via a non-return valve and to the suction manifold of the pumps via means arranged to be actuated when all the pumps are inoperative, to maintain a reservoir of stored pressurised water in the suction manifold to assist the footvalve to form a positive seal by remaining closed on its seating.

2. A pumpset system as claimed in claim 1 wherein said means comprises a solenoid valve arranged to open when all the pumps are inoperative to maintain the footvalve in the closed state, and arranged to close when any pump is operative to allow the footvalve to open and the pumps to draw a prime.

3. A pumpset system as claimed in claim 2 wherein a plurality of pressure switches respectively associated with said plurality of pumps are arranged to detect any fall in pressure in the pressure vessels due to failure of the footvalve, to initiate the pumps starting sequence before any loss of prime occurs.

4. A pumpset as claimed in claim 3 wherein a low suction pressure switch is associated with the pressure vessels to detect any leaks due to a faulty footvalve and to initiate an audible and/or visual alarm.

5. A pumpset as claimed in claim 2 wherein a liquid level probe is located between a suction manifold junction to a booster pump and the solenoid valve to detect complete absence of water in the system and to effect a shut down of the system should this occur.

* * * * *